United States Patent [19]
Zeller et al.

[11] 4,182,295
[45] Jan. 8, 1980

[54] METHOD AND APPARATUS FOR ENGINE FUEL CONTROL

[75] Inventors: Hans Zeller, Grafenau; Reinhard Latsch, Vaihingen; Johannes Brettschneider, Ludwigsburg; Valerio Bianchi, Hochdorf, all of Fed. Rep. of Germany

[73] Assignee: Robert Bosch GmbH, Stuttgart, Fed. Rep. of Germany

[21] Appl. No.: 954,146

[22] Filed: Oct. 24, 1978

Related U.S. Application Data

[63] Continuation of Ser. No. 701,175, Jun. 30, 1976, abandoned.

[30] Foreign Application Priority Data

Jul. 1, 1975 [DE] Fed. Rep. of Germany ....... 2529178

[51] Int. Cl.$^2$ .......................... F02B 3/00; F02M 37/00
[52] U.S. Cl. .......................... 123/119 EC; 123/119 D; 123/124 R; 123/124 B
[58] Field of Search ........... 123/124 R, 124 A, 124 B, 123/119 D, 119 DB, 119 EC, 32 EA, 32 EE

[56] References Cited
U.S. PATENT DOCUMENTS

| | | | |
|---|---|---|---|
| 1,097,311 | 5/1914 | Gottschalk | 123/119 DB |
| 1,737,196 | 11/1929 | Mortenson et al. | 123/119 DB |
| 2,115,485 | 4/1938 | Dodson | 123/119 DB |
| 3,190,275 | 6/1965 | Serruys | 123/119 DB |
| 3,494,341 | 2/1970 | Serruys | 123/119 DB |
| 3,568,437 | 3/1971 | Briggs | 123/119 DB |
| 3,759,232 | 9/1973 | Wahl et al. | 123/119 D |

*Primary Examiner*—Wendell E. Burns
*Attorney, Agent, or Firm*—Edwin E. Greigg

[57] ABSTRACT

A fuel supply mechanism for an internal combustion engine includes a fuel-air mixture generator and an air bypass channel for conducting supplementary air to the mixture prior to delivery to the cylinders. The bypass channel has a valve which is coupled to the main throttle valve in the induction manifold. The coupling may be entirely mechanical or electro-mechanical. In addition, a controller which acts on the basis of engine information changes the degree of coupling between the main throttle and the bypass valve to admit more or less supplementary air, depending on the value of engine variables.

16 Claims, 6 Drawing Figures

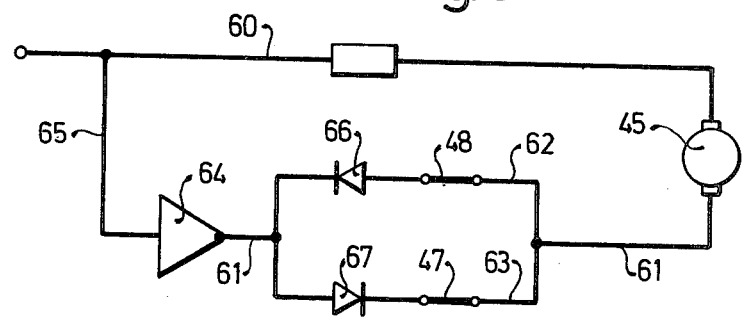
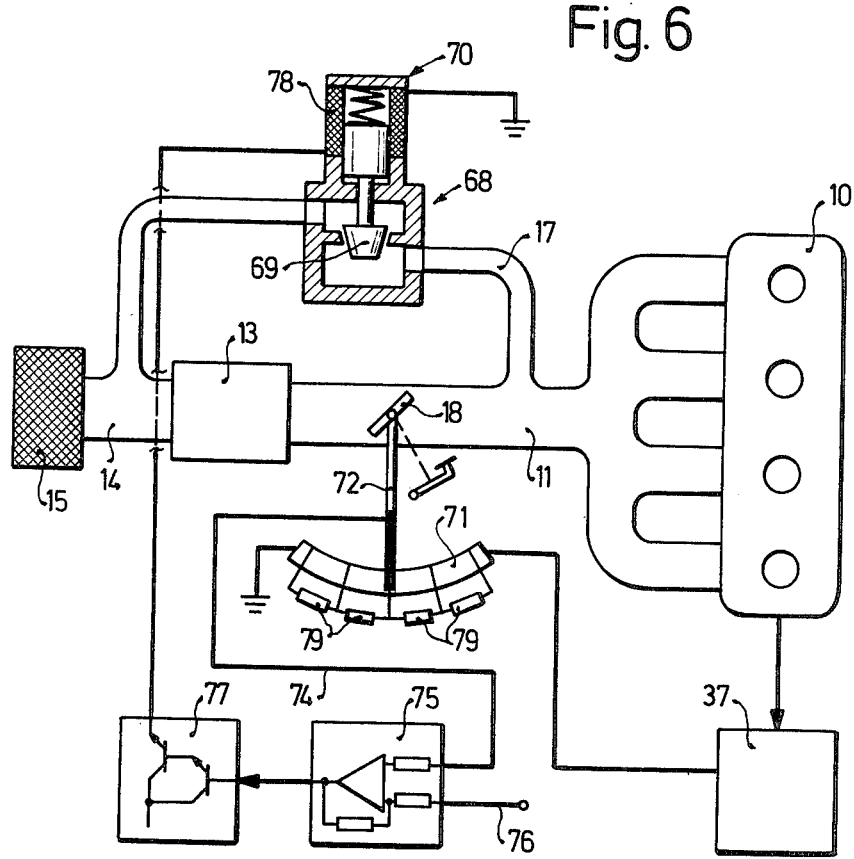

METHOD AND APPARATUS FOR ENGINE FUEL CONTROL

This is a continuation of application Ser. No. 701,175, now abandoned, filed June 30, 1976.

BACKGROUND OF THE INVENTION

The invention relates to a method and an apparatus for controlling the mixture supplied to an internal combustion engine. The method and apparatus includes a provision for supplying supplementary combustion air to the engine under certain conditions.

In known methods for fuel control, the desired mixture composition is obtained by metering out to the aspirated air a predetermined quantity of fuel. An advantage of this method is that the fuel metering is easily performed because it is substantially unaffected by atmospheric pressure and temperature, at least to a lesser degree than would be the case for the metering of air. When internal combustion engines operate at exact values of the air-fuel ratio $\lambda$ and are run lean, i.e., with the air number $\lambda \geq 1$, the torque depends heavily on the supplied fuel. Thus, while lean operation of the engine where $\lambda \geq 1$ is desirable for several reasons, i.e., low fuel consumption and clean exhaust gas composition, there is an increased problem of torque fluctuations especially when the engine fluctuations are used as the control parameter in the control loop.

OBJECT AND SUMMARY OF THE INVENTION

It is a principal object of the invention to provide a method and an apparatus for controlling the fuel-air mixture fed to an internal combustion engine, in which the above-described disadvantages are avoided and which permits rapid and precise mixture control.

This object is attained, according to the invention, by providing a quantity of supplementary combustion air and by controlling the amount of this supplementary air in dependence on the position of the normal mixture valve mechanism. The degree of dependence of the quantity of supplementary air depends on the value of operational engine parameters and may range between the values of 0 and 100%.

In known systems for altering the fuel-air mixture by the addition of supplementary air, the amount of supplementary air is directly dependent on operational engine parameters or, for example, directly dependent on the position of the main throttle valve. When supplementary air is added to a fuel mixture generated, for example, by a carburetor, and when the mixture control operates on the basis of engine fluctuations and in a lean mixture domain, a change of the supplied air produces substantially lower torque changes than would be the case if the fuel supply was changed. In addition, a control process using supplementary air operates substantially more rapidly because of the reduced inertia of the medium and the control delays are also reduced by comparison with fuel metering where there may additionally be effects due to evaporation of fuel in contact with walls. The control process is further speeded up and made more precise by providing a coarse adjustment corresponding to the position of the mixture valve mechanism and by providing a secondary multiplicative engagement of the transmitting mechanism as between the control device and the supplementary air metering mechanism. The main mixture valve mechanism may, for example, be the usual main throttle valve which is displaced during engine operation as a function of the load.

It is a further object of the invention to provide an apparatus for carrying out the above method which permits a rapid multiplicitive engagement.

This further object is attained by providing that the position changes of the throttle valve are transmitted to the supplementary air throttle by a transmitter mechanism wherein the degree of motion transfer can be changed on the basis of the value of certain engine parameters by a control mechanism and in multiplicative manner.

A preferred embodiment of the apparatus provides that the supplementary throttle is a bypass throttle valve which is coupled to the main throttle valve by a linkage including a slotted lever, one end of which is pivotable and which can be changed in position by an element connected to the controller and whose other end is attached to a lever on the supplementary air throttle shaft. In this preferred embodiment, the slot in the lever guides a sliding block which is attached to the linkage of the main throttle valve. In this manner and without great expense, the transmission ratio as between the position of the main throttle valve and the bypass throttle valve may be changed in the range from 0 to 1. Furthermore, for any position of the main throttle valve, the bypass throttle may be closed by the controller.

In another embodiment of the apparatus according to the invention, the two throttles are coupled by a parallelogram linkage including a locally pivoted lever, an actuating lever of the bypass valve and an intermediate lever on which there is mounted a sliding bushing connected mediately to the shaft of the main throttle. This embodiment also provides for changing the motion transmission between the two throttle valves in the ratio of 0 to 1. The member which provides the varying motion transmission ratio is engaged by the controller and may be a threaded sleeve moving on a threaded shaft driven by an electric motor. The presence of the electric motor provides an integrating effect in the control loop and the adjustment is rapid and exact.

The invention will be better understood as well as further objects and advantages thereof become more apparent from the ensuing detailed description of three preferred and exemplary embodiments taken in conjunction with the drawing.

BRIEF DESCRIPTION OF THE DRAWING

FIG. 5 is a schematic diagram of the electrical connections in the exemplary embodiment of FIG. 4; and FIG. 6 is a schematic diagram of a third exemplary embodiment of the invention with electrical feedback adjustment of a bypass throttle element depending on the main throttle position.

DESCRIPTION OF THE PREFERRED EMBODIMENTS

Figure 1:
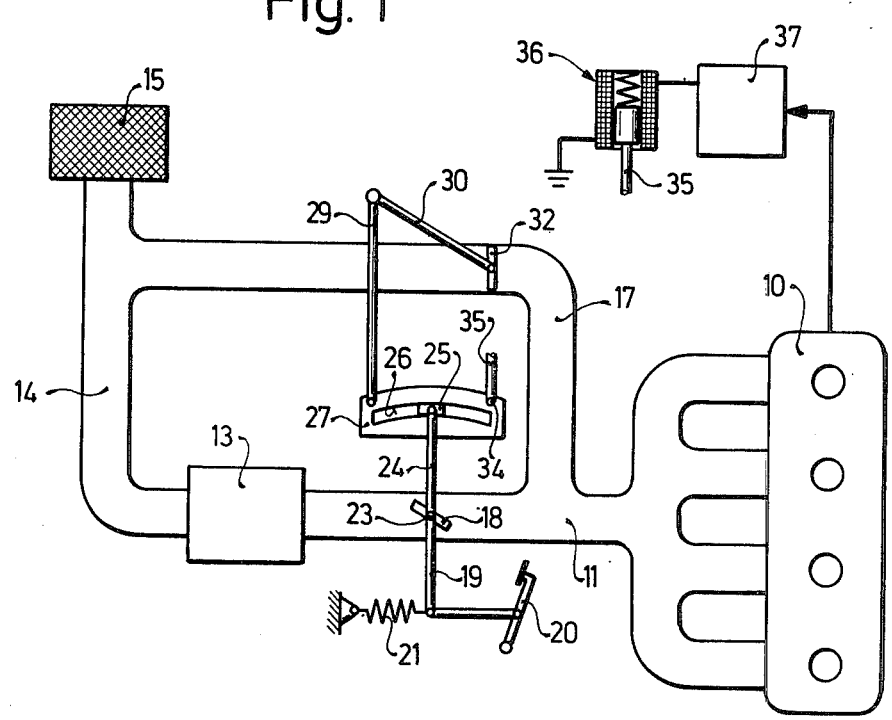
FIG. 1 is a schematic diagram of a first exemplary embodiment of the invention.

Turning now to FIG. 1, there will be seen in a first exemplary embodiment of the invention an internal combustion engine 10 with an induction manifold 11 which is supplied with a fuel-air mixture by a mixture generator 13 that receives fresh air through an air tube 14 provided with an air filter 15. The mixture generator 13 may be a carburetor of customary construction or some other mixture generator, for example, a fuel metering system which is regulated by an air flow meter or a pressure gauge or a similar device. Connected between the air induction tube 14 and the induction manifold 11 is a bypass conduit 17. Downstream of the mixture generator 13, the induction manifold 11 is provided with a main throttle valve 18 which is engaged and operated in customary manner via linkage 19 by an accelerator pedal 20 in opposition to the force of the spring 21. Mounted on a shaft 23 of the main throttle valve is a lever 24 whose free end carries a sliding block 25. The sliding block 25 is guided in a mainly arc-shaped recess 26 of an intermediate slotted lever 27. One of the ends of the slotted lever 27 is connected by a connecting rod 29 with an actuating lever 30 the other end of which is fixedly attached to the shaft of a bypass throttle 32 which rotates in the bypass conduit 17. The other end of the slotted lever 27 is engaged at a point 34 by a linkage rod 35 which leads to the armature of a control solenoid 36. The solenoid 36 is actuated by a controller 37, indicated schematically, and is supplied with the appropriate amount of current based on engine parameters sensed by the controller. The controller itself may operate for example, on a known $\lambda$-control process or an engine fluctuation control process. However, other operational parameters of the engine may also serve to engage the controller, for example the engine temperature may be a supplementary control signal.

In the apparatus illustrated in FIG. 1, the engine 10 is supplied with a certain amount of fuel-air mixture, depending on the position of the throttle valve 18. As long as the controller 37 provides no current to the solenoid 36, the pivotal point 34 of the intermediate slotted lever 27 rests in a normal position in which the control stroke is equal to 0. In this position of the intermediate slotted lever, the sliding block 25 follows the motions of the main throttle valve 18 without changing the relative position of the slotted lever so that the bypass throttle valve remains in the closed position as illustrated. However, when an appropriate signal from the engine causes the controller 37 to supply the solenoid 36 with current, the resulting change of the position of the connecting rod 35 also changes the position of the pivotal point 34 in such a way that, when the main throttle valve 18 is turning, the slotted lever 27 pivots and this pivotal motion is transmitted through the rod 29 and the lever 30 to the bypass throttle valve 32 and causes it to open. The motion of the bypass valve is related to that of the main throttle valve by a transmission factor which is determined, firstly, by the ratio of the lengths of the various levers and secondly, and primarily, by the position of the rod 35 as determined by the control solenoid 36. The maximum stroke of the armature of the solenoid 36 and the lever ratio of the linkage is so chosen that when the motion is entirely transmitted, i.e., when the transmission ratio is 1, the bypass throttle valve 32 and the main throttle valve 18 rotate in parallelism. The motion of the two throttles can be approximated by the following equation:

$$\alpha_{BYPASS} \approx \alpha_{MAIN} \cdot X$$

where $\alpha$ is the angle of rotation and $0 \leq X \leq 1$.

Thus, the present apparatus permits the controller 37 to supply supplementary air for any position of the main throttle valve 18 and the amount of supplementary air may range from a maximum value, corresponding to the actual position of the main throttle valve, and the value 0.

This apparatus provides the advantage that, quite independently of the type of mixture generator, the supplementary air passing through the bypass may be altered by the main throttle valve very rapidly and in a preliminary manner by the linkage 24, 27, 29, 30 while, in addition thereto, a corrective control takes place which is multiplitively superimposed on the primary control through the linkage. This guarantees a very rapid and precise overall regulation.

Figure 2:
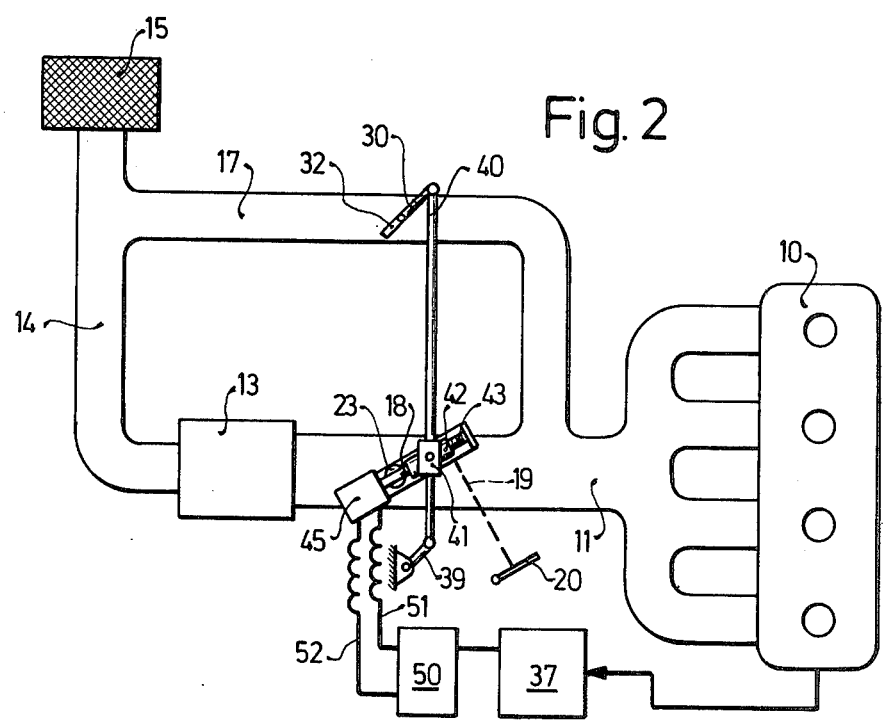
FIG. 2 is a schematic diagram of a second exemplary embodiment of the invention.

FIG. 2 illustrates a second exemplary embodiment of the invention which, similar to that of FIG. 1, shows an internal combustion engine 10 which is supplied through an induction manifold 11 with fuel-air mixture, generated in a mixture generator 13, the quantity of which is regulated by the position of a main throttle valve 18. A bypass conduit 17 leads from the air inlet tube 14 to the induction manifold 11, bypassing the fuel-air mixture generator 13. The air flow through the bypass conduit is checked by the bypass throttle 32 which is actuated by the lever 30 which, in this exemplary embodiment, is a part of a parallelogram linkage. This linkage further includes a locally fixedly pivotable lever 39 of the same length as the lever 30. The two levers 29 and 30 are connected by an intermediate rod 40 on which glides a bushing 41. An adjustment block 42 pivots on the gliding bushing 41 and is provided with internal threads which mesh with threads on a threaded shaft 43. The shaft 43 is coupled to the rotatable shaft of an electric motor 45 affixed to a member 44 which, in turn, rotates with the shaft of the main throttle valve 18. The main throttle valve 18 is actuated in the usual manner by linkage 19 connecting it to the accelerator pedal 20.

Figure 3:
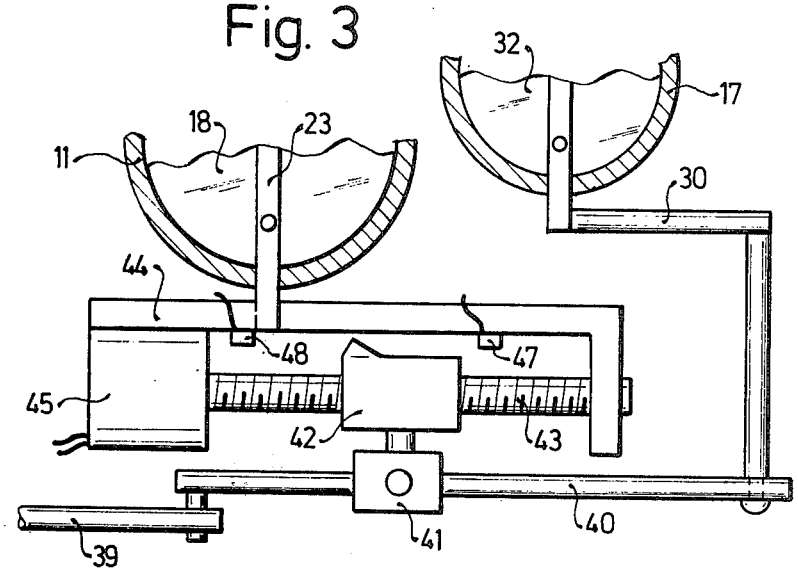
FIG. 3 represents an enlarged cross section of a portion of the apparatus of FIG. 2.

As may be seen in detail in FIG. 3, the threaded shaft 43 is held and guided by the member 44 fixedly attached to the throttle shaft 23. The member 44 carries limiting switches 47 and 48 which limit the axial motion of the block 42 and are a part of the motor control 50. The motor control 50 is in turn governed by the main engine controller 37.

This exemplary embodiment also permits the change of the transmission ratio between the motion of the main throttle valve and the motion of the bypass throttle valve in the ratio from 0 to 1 by suitable action of the controller. In one extreme configuration, when the controller exerts no influence, the motor-driven shaft 43 moves the threaded block 42 until the pivotal point between the threaded block and the gliding bushing 41 coincides with an extension of the pivotal axis of the main throttle valve 18, so that the connecting rod 40 is located on a line connecting the pivotal axes of the bypass valve and the main throttle valve 23. Under these conditions, when the main throttle valve rotates, the parallelogram linkage is not displaced. In the opposite extreme position, corresponding to a control stroke of length unity, the threaded block 42 is pushed into the other maximum position where the locally fixed lever 39 and the threaded shaft 43 are mutually parallel. Furthermore, the two throttle valve discs 18 and 32 are also parallel. Under these conditions, if the main throttle valve is rotated by the accelerator pedal, the bypass throttle valve 32 is also rotated by the parallelogram linkage 30, 39 and 40 in the same rotational position as that of the main throttle valve. The exact positions of the threaded block 42 which correspond to the extreme control positions are determined by limiting switches 47 and 48.

This apparatus also permits a rapid multiplicative control of the amount of supplementary air flowing through the bypass conduit. Furthermore, this embodiment provides the advantage that the exact transmission stroke is independent of any frictional forces and is maintained during actuation of the main throttle valve 18.

Figure 4:
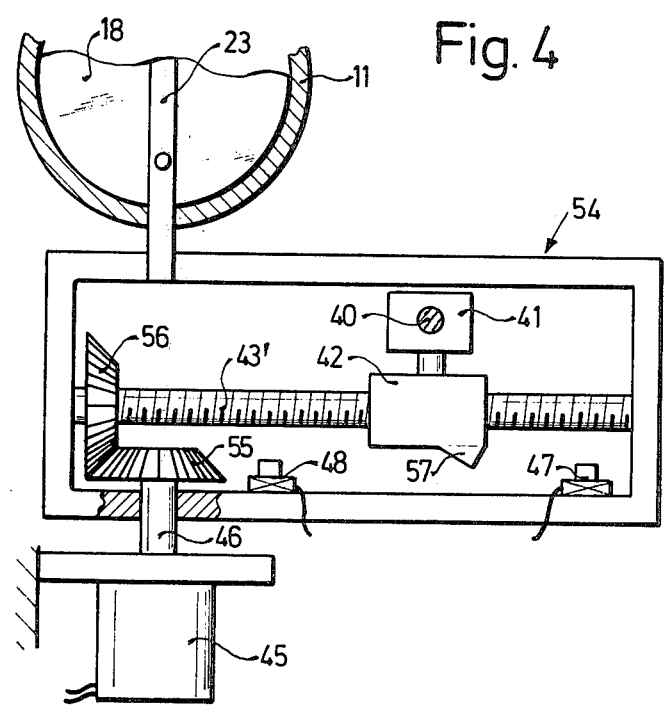
FIG. 4 is a partial cross section of a further embodiment of the apparatus of FIG. 2.

An improved version of the exemplary embodiment of FIG. 2 is illustrated in FIG. 4 which shows an arrangement in which the electric motor 45 can be stationary and does not share the motion of the rest of the linkage. As in the exemplary embodiment illustrated in FIG. 2, there is provided here a threaded shaft 43' carrying a threaded block 42. The block 42 is pivotably attached to a sliding bushing 41 which glides on the intermediate rod 40. The ends of the shaft 43' are carried within a rectangular frame 54 so that the shaft 43' and the throttle valve lie in the same plane. One of the long sides of the frame 54 is fixedly coupled to the main throttle valve shaft 23. The frame 54 also serves for carrying the shaft 46 of the electric motor 45 and this shaft is in line with the main throttle valve shaft 23. The motor shaft 46 carries a beveled gear 55 engaging a mating beveled gear 56 which turns with the threaded shaft 43' and powers it. Limiting switches 47 and 48 are attached to the interior of the frame 54 and are actuated by a protrusion 57 on the threaded block 42. The protrusion 57 and the limiting switch 48 are so disposed that, when the switch 48 is actuated, the axis of the intermediate rod 40 intersects the axis of the main throttle shaft 23 so that a rotational motion of the main throttle valve 18 does not result in any height change of the intermediate rod 40. The position of the limiting switch 47 corresponds to a position of the rod 40 in which the threaded shaft 43' is parallel to the actuating lever 30 and the lever 39. In this position, the bypass throttle valve 32 carries out the same angular motions as the main throttle valve because of the change in the height of the parallelogram linkage.

This exemplary embodiment provides the advantage that the electric motor 45 may be mounted in fixed manner and thus a change of the throttle valves involves overcoming smaller inertial resistances. The control of the motor 45 via the limiting switches 47 and 48 takes place in the same manner as in the exemplary embodiment of FIG. 2, namely by the motor control 50.

FIG. 5 is a schematic diagram of the circuitry of the motor control 50. The input signal from the main fuel controller 37 is connected through a line 60 to the motor 45. Parallel thereto is a line 61 including a network 62,63 in series with an inverting circuit 64. The inverting circuit is controlled by a line 65 branching off from the line 60. The line 62 includes the limiting switch 48 in series with a diode 66, while the branch 63 includes the limiting switch 47 in series with a diode 67 which blocks in the opposite direction of the diode 66.

The operation of this circuit is as follows: When the input control signal is positive, the electric motor operates until the protrusion 57 of the threaded block 42 actuates the limiting switch 48 and interrupts the connection between the electric motor 45 and the inverter 64. Hence, at this time, the bypass throttle valve is closed regardless of the position of the main throttle valve 18 and the fuel-air mixture does not receive any supplementary air. If the input of the motor controller now receives a zero signal from the controller 37, the motor is driven in the opposite direction until the threaded block 42 actuates the limiting switch 47 and interrupts the current to the motor. In this position, the bypass throttle valve 32 is rotated at the same rate as the main throttle valve.

In a third exemplary embodiment of the invention illustrated in FIG. 6; the reference numerals pertaining to the same elements as previously described are identical. As in previously illustrated embodiments, the internal combustion engine 10 is supplied with a fuel-air mixture generated by a mixture generator 13. However, in this embodiment, the bypass conduit 17 includes a proportional valve 68 as a throttle element. The closure member 69 of the proportional valve is actuated by a solenoid. The transmission of the rotary motion of the main throttle valve 18 within the induction manifold 11 to the bypass valve 68 takes place via the tap of a potentiometer 71 whose wiper 72 rotates with the main throttle valve shaft 23. The potentiometer 71 is supplied with voltge by the controller 37 and one of its ends is grounded. The wiper 72 is connected through a line 74 to one input of a differential amplifier 75 which compares this voltage to a reference potential supplied to its other input 76. The output of the differential amplifier 75 is fed to a power amplifier 77 which drives the magnetic winding 78 of the solenoid 70 which is thus excited in accordance with the voltage tapped off at the potentiometer 71 and which then changes the opening cross section of the proportional valve 68.

In order to alter the opening characteristics of the valve in a desired manner, the potentiometer 71 may include a number of parallel resistors 79 as shown in FIG. 6.

In the apparatus according to this exemplary embodiment, a preliminary coarse adjustment of the valve 68 takes place in accordance with the position of the main throttle valve 18. This coarse adjustment is then followed by a corrective control exerted by the controller 37 which changes the applied potential across the potentiometer between minimum and maximum values. As in previous examples, this change is performed on the basis of engine variables. In the same manner, the valve 68 is either held closed independently of the position of the main throttle valve 18 or else it changes the flow cross section of the valve in proportion to the average flow cross section at the main throttle valve and in accordance to the effect of the controller 37. An appropriate configuration of the potentiometer track would permit a simulation of the opening characteristic $1-\cos\alpha$ of a throttle valve even when some other throttle element is used.

It will be understood that other closing elements whose motion is continuously controllable could be used. In addition, instead of the described final control elements, other continuously operating elements could be employed, for example a heated bimetallic spring whose effect could be adapted to the prevailing conditions.

In the exemplary embodiment of FIG. 1, for example, the solenoid may be replaced by the drive mechanism of FIGS. 2 and 4. In that case, the solenoid would be replaced by a locally fixed electric motor driving a shaft and a sliding block which is pivotably connected with the slotted lever 27 at the point 34. In that case, as in the exemplary embodiment of FIGS. 2 and 4, the electric motor is controlled by a motor control 50 and the path of the threaded block is limited by switches. This type of arrangement brings the advantage that the desired motion transfer is maintained independently of any frictional forces. Furthermore, the electric motor provides an integrating effect in the control process.

The foregoing represents preferred exemplary embodiments of the invention, it being understood that many variants are possible within the spirit and scope of the invention, the latter being defined by the appended claims.

What is claimed is:

1. A method for controlling the fuel-air mixture of an internal combustion engine comprising the steps of:
    generating a fuel air mixture;
    admitting quantities of said fuel-air mixture to said engine by throttle means;
    admitting quantities of additional air to said fuel-air mixture in dependence on the state of said throttle means; and
    changing the magnitude of said dependence on the basis of information regarding engine operating variables.

2. An apparatus for the closed loop control of the fuel-air mixture of an internal combustion engine, said engine including an air intake tube, fuel-air mixture generator means, an induction manifold and a main throttle in said induction manifold, comprising:
    a bypass conduit leading directly to said induction manifold, bypassing said generator means;
    a bypass valve disposed within said bypass conduit for controlling the air flow therethrough;
    means for sensing motion of the main throttle and effecting a corresponding motion transfer of said bypass valve; and
    means for changing the degree of motion transfer exerted by said means for sensing, on the basis of engine parameters which vary as the fuel-air mixture composition varies, wherein the transmission ratio as between the position of the main throttle and the bypass valve may be changed in the range from 0 to 1, independently of the position of the main throttle and with a changing rate over said range which is independent of said engine parameters.

3. An apparatus as defined by claim 2, wherein said bypass valve is a throttling flap coupled to said main throttle by a linkage including a slotted lever 27 pivotable at one end, said pivotable end being displaceable by a control element actuated by a controller, the other end of said slotted lever being attached to a rod connected with said bypass throttle flap, the slot in said slotted lever guiding a sliding block attached to an actuating lever on said main throttle.

4. An apparatus as defined by claim 3, wherein said control element is a solenoid element.

5. An apparatus as defined by claim 3, wherein said control element is a heatable bimetallic spring.

6. An apparatus as defined by claim 3, wherein said control element is a threaded shaft driven by an electric motor carrying a threaded block which is pivotably connected with said pivotable point on said slotted lever.

7. An apparatus for controlling the fuel-air mixture of an internal combustion engine, said engine including an air intake tube, fuel-air mixture generator means, an induction manifold and a main throttle in said induction manifold, comprising:
    a bypass conduit leading directly to said induction manifold, bypassing said generator means;
    a throttle flap bypass valve disposed within said bypass conduit for controlling the air flow therethrough;
    means for sensing motion of the main throttle and effecting a corresponding motion of said bypass valve, said means for sensing coupling said throttle flap to said main throttle and including a parallelogram linkage which includes a locally fixed and pivoting lever and a connecting rod coupled to said locally fixed lever and the actuating lever on said bypass throttle flap, and further including a sliding bushing sliding on said rod pivotably attached to a block that engages a lever connected to the main throttle, said block being displaceable by a fuel metering controller between two terminal positions; and
    means for changing the degree of motion transfer exerted by said means for sensing, on the basis of engine operating variables.

8. An apparatus as defined by claim 7, wherein said block is a threaded block and said lever is a threaded shaft driven by an electric motor.

9. An apparatus as defined by claim 8, wherein said electric motor is locally fixed and the shaft of said electric motor is coaxial with the shaft of said main throttle and further including bevel gears for driving said threaded shaft.

10. An apparatus as defined by claim 9, wherein said electric motor may be turned on and off via limiting switches actuated by said threaded block.

11. An apparatus as defined by claim 7, wherein said threaded block may be displaced by a heatable bimetallic spring.

12. An apparatus as defined by claim 7, wherein said block may be displaced by a solenoid.

13. An apparatus as defined by claim 2, further including potentiometer means attached to said main throttle and serving to generate a signal related to the position of said main throttle, said bypass conduit including solenoid-actuated valve means controlled by said signal from said potentiometer means, the voltage across said potentiometer being supplied by engine controller means, said apparatus further including comparator means for comparing the signal from said potentiometer means with a reference signal.

14. An apparatus as defined by claim 13, wherein said bypass valve means is a solenoid-actuated proportional valve.

15. An apparatus as defined by claim 14, wherein the output signal from said potentiometer means is changeable by energizing electrical contacts attached to the potentiometer track.

16. An apparatus as defined in claim 7, wherein the bypass conduit is connected to said air intake tube upstream of said generator means.

* * * * *